United States Patent
Yelistratov et al.

(10) Patent No.: US 8,257,049 B2
(45) Date of Patent: Sep. 4, 2012

(54) PROCESS FOR BUILDING UP AN EDGE OF A MACHINE COMPONENT, AND MACHINE COMPONENT REMANUFACTURING STRATEGY

(75) Inventors: Alexei Yelistratov, Dunlap, IL (US); Marion Grant, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 1167 days.

(21) Appl. No.: 12/150,246

(22) Filed: Apr. 25, 2008

(65) Prior Publication Data

US 2009/0269206 A1 Oct. 29, 2009

(51) Int. Cl.
*F01D 5/14* (2006.01)

(52) U.S. Cl. ............... 416/241 R; 416/228; 219/121.64

(58) Field of Classification Search ............... 416/228, 416/241 R; 219/121.64, 121.78
See application file for complete search history.

(56) References Cited

U.S. PATENT DOCUMENTS

| | | | | |
|---|---|---|---|---|
| 5,595,670 A * | 1/1997 | Mombo-Caristan | ..... | 219/121.64 |
| 6,596,963 B2 * | 7/2003 | Kelly | ....................... | 219/121.64 |
| 6,615,470 B2 * | 9/2003 | Corderman et al. | ........ | 29/402.13 |
| 6,727,459 B1 * | 4/2004 | Bialach | ..................... | 219/121.64 |
| 6,740,845 B2 * | 5/2004 | Stol et al. | ................. | 219/121.64 |
| 6,972,390 B2 | 12/2005 | Hu et al. | | |
| 7,259,353 B2 * | 8/2007 | Guo | ......................... | 219/121.63 |
| 2005/0194363 A1 | 9/2005 | Hu et al. | | |
| 2006/0049153 A1 | 3/2006 | Cahoon et al. | | |
| 2006/0067830 A1 | 3/2006 | Guo et al. | | |
| 2008/0189946 A1 * | 8/2008 | Moor et al. | .................. | 29/889.1 |

FOREIGN PATENT DOCUMENTS

| | | | |
|---|---|---|---|
| JP | 07009173 A | * | 1/1995 |
| JP | 3697874 | | 9/2005 |
| WO | 03070414 | | 8/2003 |

* cited by examiner

*Primary Examiner* — Ninh H Nguyen
(74) *Attorney, Agent, or Firm* — Liell & McNeil

(57) ABSTRACT

A process for building up a leading edge of a machine component such as a leading edge of a turbine blade for a turbocharger includes forming a molten pool along the edge of the machine component, feeding a filler material in a solid state into the molten pool and melting the filler material via heat transfer between the molten pool and the filler material. A solid layer may be formed along the leading edge by cooling the molten pool. The process is applicable to remanufacturing damaged machine components having a plurality of blades with relatively thin leading edges.

19 Claims, 3 Drawing Sheets

PROCESS FOR BUILDING UP AN EDGE OF A MACHINE COMPONENT, AND MACHINE COMPONENT REMANUFACTURING STRATEGY

TECHNICAL FIELD

The present disclosure relates generally to strategies for depositing a layer of filler material along a thin edge of a machine component, and relates more particularly to melting filler material via heat transfer with a molten pool formed along a thin edge of a machine component.

BACKGROUND

Many machine components are used in relatively demanding operating environments which can lead to damage or wear over time. The relatively high temperatures and pressures associated with many turbine applications are one example of a relatively demanding operating environment. Turbine wheels used in connection with turbochargers commonly develop blade damage after a certain period of service, depending upon the particular service conditions.

When an internal combustion engine is started or stopped, many of its components tend to heat or cool, respectively, relatively rapidly. Differing rates of expansion or contraction among components of the internal combustion engine can generate many relatively small particles which dislodge from the components. In an exhaust system, such particles may become airborne and impact blades of a turbocharger's turbine wheel relatively hard, adding to the already demanding nature of the environment. Micro-cracks, pits, chips and other forms of blade damage can occur due to impacts with particles, or for other reasons in a conventional turbocharger. When an associated internal combustion engine or certain of its components are removed from service, such as for remanufacturing, damaged turbine wheels are typically scrapped. Since turbine wheels are relatively highly machined and precisely designed components, the economic downside to wholesale scrapping of turbine wheels will be readily apparent.

A number of strategies for repairing bladed components, such as turbine vanes used in gas turbine engines, have been proposed over the years. United States Patent Application Publication No. 2006/0049153 to Cahoon et al. ("Cahoon") is directed to a dual feed laser welding system which is purportedly applicable to gas turbine engine components for automated welding repairs. Cahoon proposes feeding a filler material through a wire feeder, then melting the filler material via a laser and permitting the melted filler material to be deposited on a component to be repaired. While Cahoon may be applicable in certain instances, the strategy is not without drawbacks. Positioning the filler material wire within a laser beam, elevated from the component to be repaired, tends to reflect a certain amount of the laser light by way of the typically shiny outer surface of the wire. In addition, the melted filler material is apparently dropped or spattered onto the component to be repaired, which would tend to waste material and reduce the overall precision, quality and consistency of the welding process. Various proposals for powder spray welding and other strategies suffer from similar drawbacks with regard to wasting material and consuming laser energy.

The present disclosure is directed to one or more of the problems or shortcomings set forth above.

SUMMARY

A process for building up an edge of a machine component includes the steps of forming a molten pool of a first material along the edge of the machine component by melting the machine component via a laser, and feeding a second material in a solid state into the molten pool. The process further includes the steps of melting the second material within the molten pool via heat transfer with the molten pool, and forming a solid layer including a mixture of the first material and the second material along the edge of the machine component by cooling the molten pool.

In another aspect, a method of remanufacturing a machine component having a leading edge includes a step of receiving a machine component removed from service having a leading edge which defines a leading edge contour different from a specified contour. The method further includes the steps of returning the leading edge contour to the specified contour at least in part via the steps of forming a molten pool of a first material along the leading edge of the machine component by melting the machine component via a laser and feeding a second material comprising a filler material in a solid state into the molten pool. The step of returning the leading edge contour to the specified contour further includes a step of melting the second material within the molten pool via heat transfer with the molten pool and forming a solid layer including a mixture of the first material and the second material along the leading edge by cooling the molten pool.

In still another aspect, a machine component is remanufactured according to a process which includes the step of receiving a machine component having a leading edge which defines a leading edge contour different from a specified contour. The process further includes a step of returning the leading edge contour to the specified contour at least in part via the steps of forming a molten pool of a first material along the leading edge of the machine component by melting the machine component via a laser, feeding a second material including a filler material in a solid state into the molten pool, and melting the second material within the molten pool via heat transfer with the molten pool. The step of returning the leading edge contour to the specified contour further includes a step of forming a solid layer including a mixture of the first material and the second material along the leading edge by cooling the molten pool.

DETAILED DESCRIPTION

Figure 1:
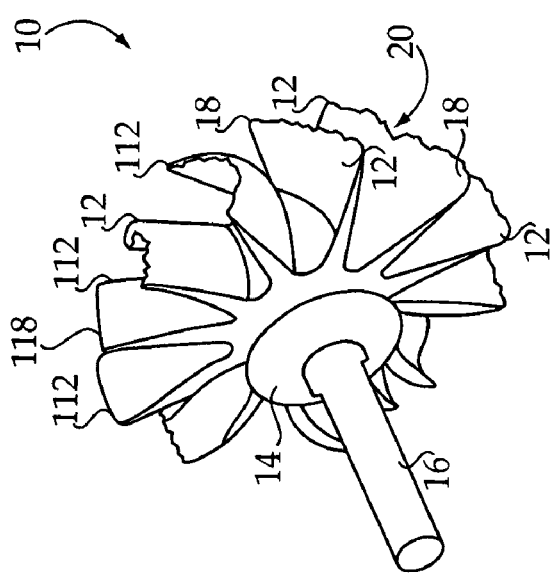
FIG. 1 is a diagrammatic view of a machine component removed from service, according to one embodiment.

Referring to FIG. 1, there is shown a machine component 10 removed from service. In the illustrated embodiment, machine component 10 is a rotatable machine component having a plurality of radially arranged blades 12, 112. Machine component 10 further includes a body 14 coupled with a shaft 16. Machine component 10 is illustrated in the context of a turbine wheel for a conventional turbocharger, however, it should be appreciated that the present disclosure is not limited to turbine wheels. In other embodiments, other rotatable machine components, bladed or non-bladed, and even non-rotatable machine components might be advantageously processed according to the teachings set forth herein. In the illustrated embodiment, machine component 10 (hereinafter turbine wheel 10) has a plurality of damaged blades 12 and a plurality of substantially undamaged blades 112. In some instances, when a turbine wheel such as turbine wheel 10 is removed from service all of its blades may be damaged, or only a small number of the blades may be damaged. In any event, damaged blades 12 may have a leading edge 18 which defines a leading edge contour different from a specified contour. The difference between the leading edge contour and a specified contour may result from damage to leading edge 18, such as the presence of chips 20 or other malformations resulting from operation of turbine wheel 10 when in service in a turbocharger. Undamaged blades 112 include a substantially undamaged leading edge 118 which approximates the specified leading edge contour described herein. The differences between damaged leading edges 18 and undamaged leading edges 118 will be readily apparent in FIG. 1.

Figure 2:
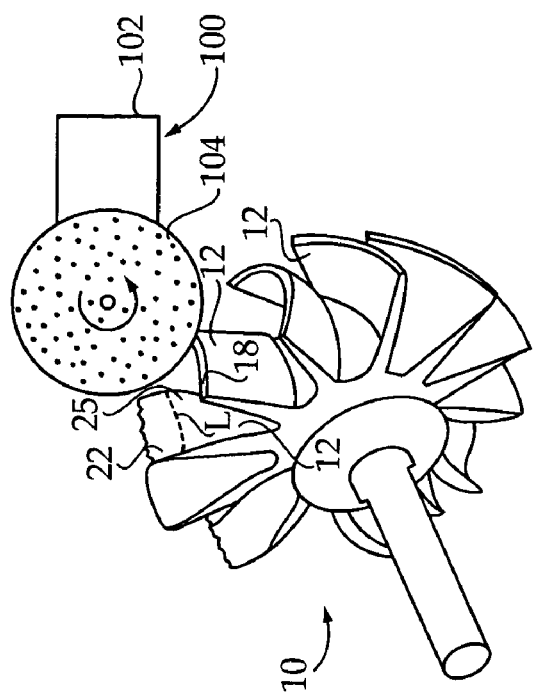
FIG. 2 is a diagrammatic view of a machine component at a remanufacturing stage, according to one embodiment.

The present disclosure provides a strategy for building up an edge on a machine component, such as turbine wheel 10, whereby a leading edge contour which differs from a specified contour may be returned to the specified contour. To this end, when turbine wheel 10 is received after removing from service in a turbocharger, etc., it may be remanufactured according to processes described hereinbelow. Turning to FIG. 2, there is shown turbine wheel 10 at a remanufacturing stage according to one embodiment. Remanufacturing of turbine wheel 10 may begin by inspecting turbine wheel 10 for major damage, or other conditions which might render it unsuitable for ever returning to service. For instance, if shaft 16 were bent or cracked, turbine wheel 10 might be considered not amenable to remanufacturing and therefore scrapped. Likewise, damage to one or more of blades 12 could in some instances be so severe that attempted remanufacturing of turbine wheel 10 would not be considered worthwhile. In any event, following an initial inspection stage, turbine wheel 10 might be cleaned and prepared for further processing. Once appropriately prepared, turbine wheel 10 may be processed via a first machining apparatus 100 to remove material 22 of each damaged turbine blade 12. In FIG. 2, a line L represents a demarcation between material 22 to be removed, and material 25 which is to remain. Machining apparatus 100 may include a base 102 and a rotatable tool 104, such as a rotary grinder, which is used to grind or otherwise remove material 22 from each of damaged turbine blades 12. It will be noted in the FIG. 2 illustration that material corresponding to a portion of each one of a plurality of blades 12 has been removed, and machining apparatus 100 is engaged with one of blades 12. Machining damaged blades 12 via machining apparatus 100 may be undertaken to prepare each leading edge 18 for further processing by providing a relatively uniform, level and otherwise clean leading edge 18 on each of the damaged blades 12.

Figure 3A:
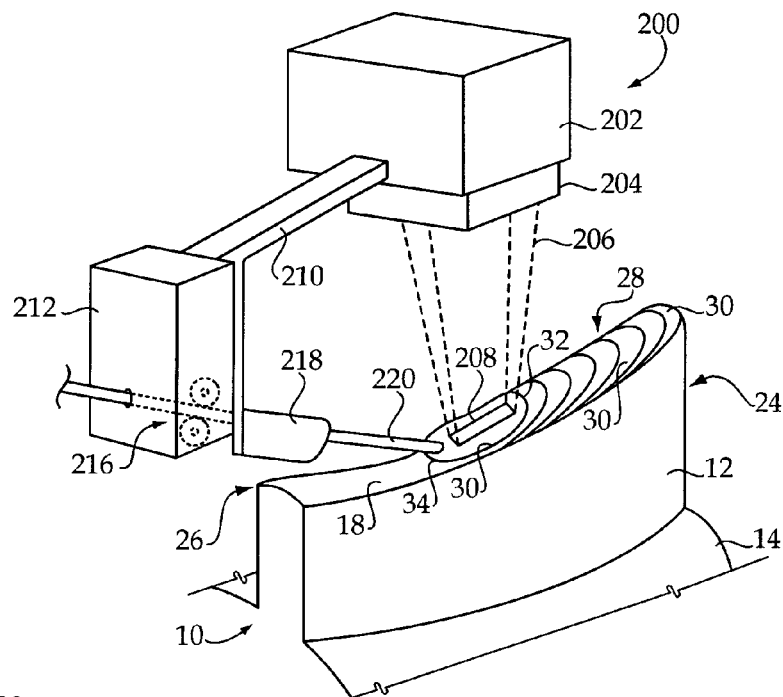
FIG. 3a is a diagrammatic view of a portion of a machine component at another remanufacturing stage, according to one embodiment.

Turning now to FIG. 3a, there is shown turbine wheel 10 at another remanufacturing stage. At the remanufacturing stage depicted in FIG. 3a, a laser apparatus 200 may be positioned in proximity to turbine wheel 10 and used to deposit material along leading edge 18 to build up leading edge 18, thereby returning a leading edge contour defined by leading edge 18 to the specified contour, as described herein. Laser apparatus 200 may include a housing 202 having an emitter 204 coupled therewith which is configured to emit a laser beam 206 and locate a beam spot 208 of beam 206 on leading edge 18. In one embodiment, emitter 204 may comprise a diode laser emitter and beam 206 may be a flat beam having a rectangular configuration, with a corresponding rectangular beam spot 208, which is oriented longitudinally along leading edge 18. In other words, a longer dimension of beam spot 208 may be oriented such that it is generally aligned with a length dimension of leading edge 18, between a first end 24 and a second end 26 of leading edge 18. Laser apparatus 200 may further include a support arm 210 having a wire feeding apparatus 212 mounted thereon. Wire feeding apparatus 212 may include a housing 214 and a feeder 216 which is a pull-type feeder mounted therein. Feeder 216 may be configured to feed a wire 220 from a wire spool (not shown). Wire 220 may be guided via wire guide 218 in a desired orientation to a desired location along leading edge 18.

Many earlier laser deposition processes, such as Cahoon described above, utilized strategies for feeding of filler material and laser configurations having a variety of shortcomings, at least when applied to building up thin edges of machine components. The present disclosure overcomes problems associated with such earlier designs. In one embodiment, laser apparatus 200 may be used to form a solid layer 28 along leading edge 18 to build up leading edge 18. Forming solid layer 28 may take place by forming a plurality of molten pools 30 of a first material along leading edge 18 by melting turbine wheel 10 via laser beam 206. Laser apparatus 200 may be moved relative to turbine wheel 10 such that beam spot 208 moves longitudinally along leading edge 18 from first end 24 of blade 12 toward second end 26 of blade 12. Alternatively, turbine wheel 10 might be moved relative to laser apparatus 200. As beam spot 208 traverses leading edge 18, it may melt machine component 10 to form a plurality of overlapping molten pools 30, which successively solidify as they cool. While moving beam spot 208 as described, a second material which includes a filler material such as wire 220 may be fed in a solid state into the molten pool presently formed via beam 206. As wire 220 is fed into molten pool 30, wire 220 may melt via heat transfer between molten pool 30 and the material of wire 220. Cooling of each molten pool may result therefore in deposition of a solid layer 28. Solid 28 may thus include a mixture of the first material, material of turbine wheel 10, and the second material, material of wire 220. Where a layer of material has already been deposited along leading edge 18, the "first" material may include previously deposited filler material. In this general manner, solid layer 28 may be deposited along an entirety of leading edge 18 from first end 24 to second end 26. It should be appreciated that melting of material of turbine wheel 10 along leading edge 18 may be such that only a single molten pool 30 exists at any one time, or such that multiple pools of cooling yet still molten material exist at once.

As mentioned above, wire 220 may be melted via heat transfer between molten pool 30 and the material of wire 220. It should be understood that the present description of melting material of wire 220 via heat transfer with molten pool 30 differs from earlier strategies where a filler material was melted by directly applying a laser beam to the filler material. In one embodiment, wire 220 may be fed into molten pool 30 in a region of molten pool 30 which is not within beam spot 208. In the embodiment shown in FIG. 3a, wire 220 is fed into molten pool 30 ahead of beam spot 208 as beam spot 208 traverses leading edge 18. In other embodiments, wire 220 might be fed into a different portion of molten pool 30 than that which is shown. It has been discovered that using a rectangular beam spot provides a relatively longer molten pool, resulting in relatively greater time for mixing of the material of wire 220 with material of turbine wheel 10 than would be available with another beam spot shape, such as a circular shape. This has been found to result in a relatively greater uniformity of solid layer 28. Depending upon the relative width of blade 12, beam spot 208 may be oscillated back and forth across its width to enhance melting and/or mixing of the respective materials, or for other purposes.

Figure 3B:
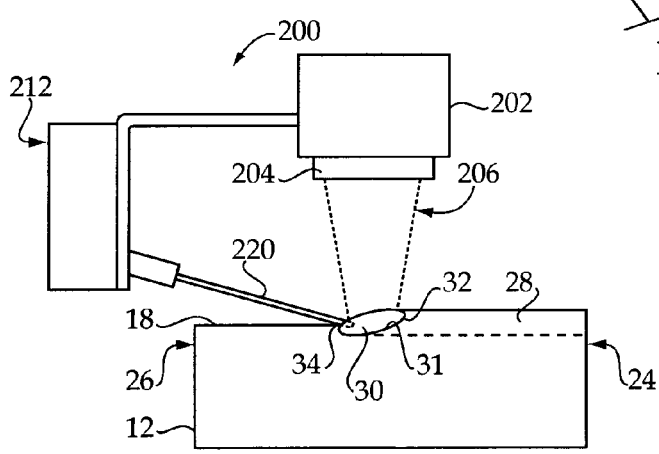
FIG. 3b is a diagrammatic view of a machine component at the remanufacturing stage of FIG. 3a, in a different perspective.

Turning to FIG. 3b, there is shown laser apparatus 200 and turbine wheel 10 approximately at the same stage depicted in FIG. 3a, but from a different perspective. As shown in FIG. 3b, wire 220 may be fed into molten pool 30 ahead of beam spot 208. It may also be noted that wire 220 may be fed into molten pool 30 such that wire 220 does not contact a bottom 31 of molten pool 30. Once solid layer 28 has been deposited along an entirety of leading edge 18 or a desired portion of leading edge 18 less than its entirety, machine component 10 or laser apparatus 200 may be reoriented for deposition of an additional solid layer on top of solid layer 28. Depending upon the extent to which a height of blade 12 is to be built up, many layers may be successively deposited one on top of the other along leading edge 18 until leading edge 18 is built up to a desired height. An inert gas shield may be used in the vicinity of beam spot 208 to avoid forming of oxides on or around molten pool 30. It may also be desirable to flood leading edge 18 with inert gas during forming each layer, or perform the welding operation in an inert gas chamber. Leading edge 18 may then be finish machined, etc., to restore the leading edge contour defined by leading edge 18 to the specified contour.

Figure 4:
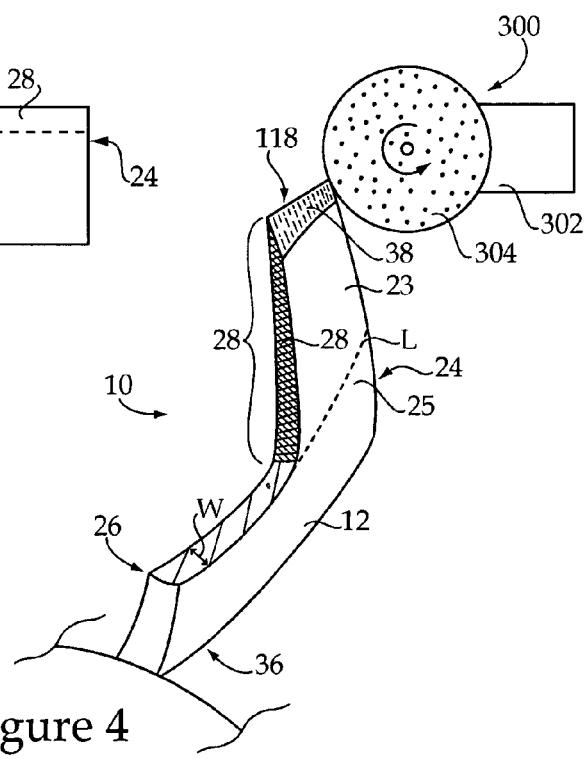
FIG. 4 is a sectioned diagrammatic view of a machine component, in two section planes, at another remanufacturing stage, according to one embodiment.

Turning now to FIG. 4, there is shown a sectioned view taken in two section planes through a portion of blade 12 after processing via the remanufacturing stages depicted in FIGS. 2, 3a and 3b. It will be noted that a plurality of solid layers 28 have been formed on leading edge 18. It may further be noted that new material 23 which includes solid layers 28 is positioned on one side of line L, whereas old material 25 is positioned on an opposite side of line L. In the embodiment shown, old material 25 includes material between a base edge 36 of blade 12 and line L, whereas new material 23 includes material between line L and a leading edge 118 of blade 12 which has been returned to the specified contour. In the embodiment shown, solid layers 28 which are relatively further from base edge 36 have a first width which is relatively lesser than a width of solid layers 28 which are relatively closer to base edge 36. In one embodiment, an average width of each of layers 28 may be about 1 mm or less, and an average thickness of layers 28 may be about 1 mm or less. Another machining apparatus 300, having a base 302 and a tool 304 such as a rotary grinder, is shown as it might appear having just completed forming a ground surface 38 on blade 12 to finish machine blade 12 and return the leading edge contour to the specified leading edge contour.

Figure 5:
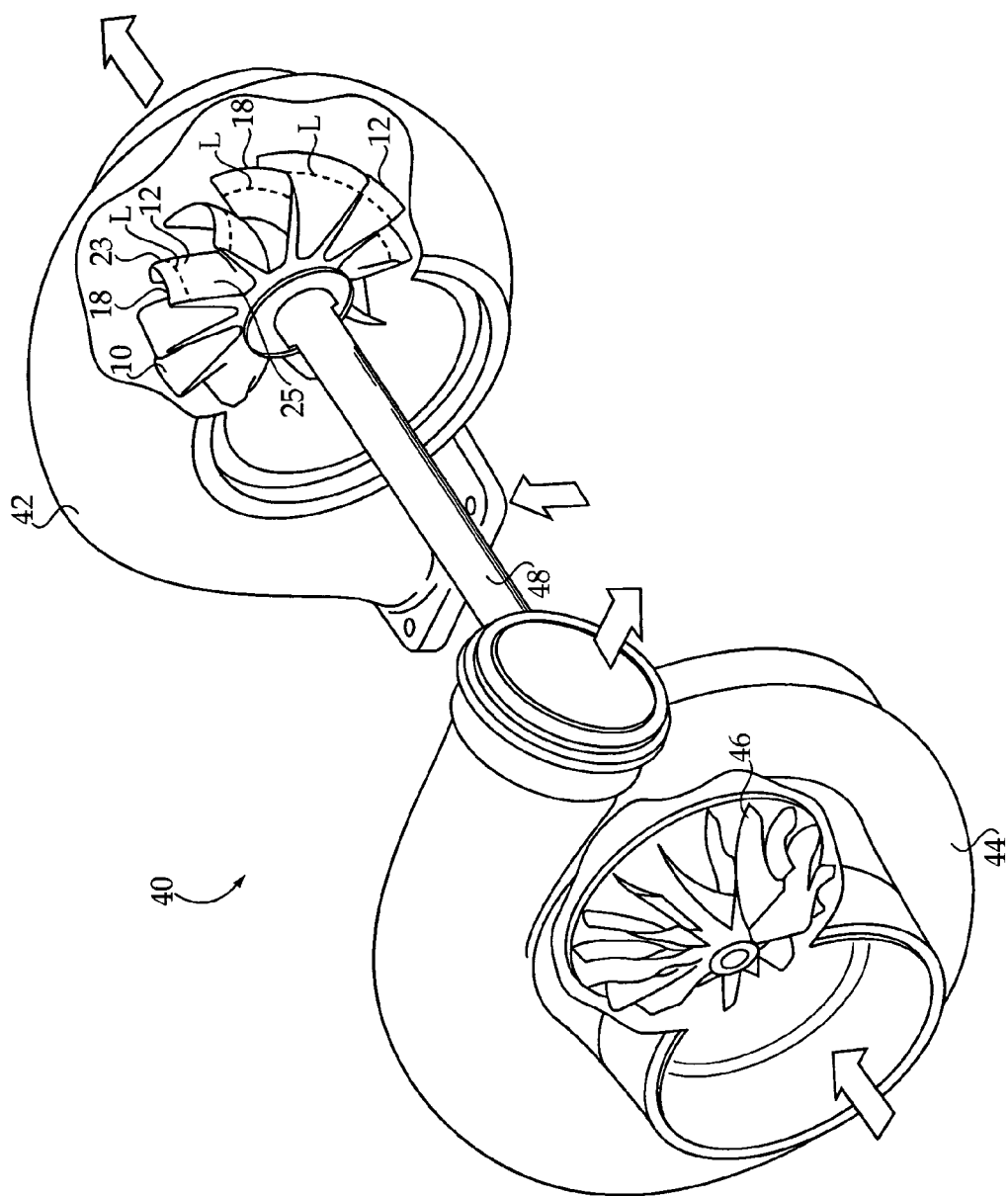
FIG. 5 is a diagrammatic view of a remanufactured machine component, according to one embodiment.

Turning now to FIG. 5, there is shown a turbocharger 40 having turbine wheel 10 coupled therewith. Turbocharger 40 includes a turbine housing 42, a compressor housing 44 having a compressor wheel 46 therein and a shaft 48 connecting compressor wheel 46 with turbine wheel 10. As shown in FIG. 5, turbine wheel 10 has thus been reassembled with other components of a turbocharger in preparation for returning to service.

INDUSTRIAL APPLICABILITY

Many different techniques for repair of all manner of machine components are known, including a variety of laser deposition techniques suitable for building up material along an edge. Known strategies suffer from drawbacks, however, such as spattering and material waste, as described above. The present disclosure provides a new technique which advantageously addresses these and other concerns. In building up an edge of a machine component according to the present disclosure, materials which are easily targeted to a location along leading edge 18, relatively inexpensive and relatively easy to melt may be used as the filler material. Moreover, since wire 220 is not exposed in a molten state to air prior to melting in pool 30, oxidation and evaporation may be reduced, as well as absorption of gases by molten material. In the present disclosure, essentially no molten material will be deposited on leading edge 18 outside of molten pool 30, enhancing fusion and uniformity and minimizing defects. Further still, since melting wire 220 via enthalpy of molten pool 30 is relatively highly efficient losses of beam energy such as what may occur where a wire is placed in a path of a laser are reduced. Relatively high wire feeding speeds of up to 30-40 inches per minute may therefore be used.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. For instance, while repairing damaged turbine blades is one application of the teachings set forth herein, the present disclosure is not thereby limited. Many machine systems have thin-walled components having edges, such as flanges, susceptible to damage which could readily be repaired according to the present disclosure. Moreover, the present disclosure may be applied outside the context of repair and remanufacturing, for instance in making new parts having thin edges and the like which are to be built up to specified heights, contours, etc. Furthermore, while it is contemplated that feeding wire 220 at a relatively constant feed rate and moving laser apparatus 200 at a relatively constant speed relative to leading edge 18 will be a practical implementation strategy for forming a smooth, uniformly thick layer 25, alternatives are contemplated. In other embodiments, wire feed rate and/or the relative speed with which beam spot 208 is moved along leading edge 208 might be varied to vary characteristics of solid layer 28, such as uniformity, thickness, etc., for various applications. Other aspects, features and advantages will be apparent upon an examination of the attached drawings and appended claims.

What is claimed is:

1. A process for building up an edge of a machine component comprising the steps of:
    forming a molten pool of a first material along the edge of the machine component by melting the machine component via a laser;
    feeding a second material comprising a filler material in a solid state into the molten pool without passing the second material through a beam path of the laser;
    melting the second material within the molten pool via heat transfer with the molten pool; and
    forming a solid layer comprising a mixture of the first material and the second material along the edge of the machine component by cooling the molten pool.

2. The process of claim 1 wherein the step of forming a molten pool comprises a step of applying a beam of a diode laser to the edge of the machine component, and wherein the step of feeding a second material further comprises feeding a wire into the molten pool.

3. The process of claim 2 wherein the step of applying a beam of a diode laser comprises locating a beam spot of the beam on the edge of the machine component, and wherein the step of feeding a second material comprises feeding the wire into a portion of the molten pool which is not within the beam spot.

4. The process of claim 3 wherein the step of feeding a second material further comprises feeding the wire into the molten pool without contacting a bottom of the molten pool.

5. The process of claim 3 wherein the step of applying a beam further comprises applying a flat beam having a rectangular beam spot and orienting the rectangular beam spot longitudinally along the edge of the machine component, the process further comprising a step of moving the beam spot longitudinally relative to the edge of the machine component during the forming step and during the feeding step.

6. The process of claim 5 wherein the step of feeding the second material comprises feeding the wire into the molten pool ahead of the beam spot during moving the beam spot.

7. The process of claim 6 wherein the step of forming a solid layer comprises building up the edge of the machine component via a first solid layer, the process further comprising a step of further building up the edge via a plurality of additional solid layers.

8. The process of claim 7 comprising a process for building up a leading edge of a turbine blade, wherein the step of forming a solid layer comprises forming a first solid layer having a first width and wherein the step of further building up the edge includes forming a second solid layer having a second, relatively lesser width.

9. The process of claim 8 further comprising a step of oscillating the beam spot back and forth across a width of the edge of the machine component during forming a first solid layer.

10. A method of remanufacturing a machine component having a leading edge comprising the steps of:
receiving a machine component removed from service having a leading edge which defines a leading edge contour different from a specified contour; and
returning the leading edge contour to the specified contour at least in part via the steps of forming a molten pool of a first material along the leading edge of the machine component by melting the machine component via a laser, feeding a second material comprising a filler material in a solid state into the molten pool without passing the second material through a beam path of the laser, melting the second material within the molten pool via heat transfer with the molten pool and forming a solid layer comprising a mixture of the first material and the second material along the leading edge by cooling the molten pool.

11. The method of claim 10 wherein the machine component comprises a rotatable element having a plurality of blades, and wherein the receiving step comprises receiving a rotatable element having at least one damaged blade which defines the leading edge contour different from the specified contour.

12. The method of claim 11 further comprising a step of preparing the leading edge prior to the step of returning the leading edge contour to a specified contour, including removing damaged material of the at least one damaged blade.

13. The method of claim 12 wherein the step of forming a molten pool comprises applying a flat beam of a diode laser to the leading edge of the machine component, including locating a rectangular beam spot of the flat beam on the leading edge of the machine component, and wherein the step of melting the second material within the molten pool comprises feeding a wire into a portion of the molten pool which is not within the rectangular beam spot.

14. The method of claim 13 wherein the step of forming a solid layer comprises forming a first solid layer and the step of returning the leading edge contour to the specified contour comprises building up the leading edge via the first solid layer, the step of returning the leading edge contour to the specified contour further comprising building up the leading edge via forming a plurality of additional solid layers along the leading edge.

15. The method of claim 14 wherein the method comprises a method of remanufacturing a turbocharger, and further comprising the steps of returning a plurality of leading edges of a plurality of damaged blades of a damaged turbine wheel for the turbocharger to the specified contour, then reassembling the turbine wheel with a turbocharger housing.

16. A machine component remanufactured according to a process comprising the steps of:
receiving a machine component having a leading edge which defines a leading edge contour different from a specified contour; and
returning the leading edge contour to the specified contour at least in part via the steps of forming a molten pool of a first material along the leading edge of the machine component by melting the machine component via a laser, feeding a second material comprising a filler material in a solid state into the molten pool without passing the second material through a beam path of the laser, melting the second material within the molten pool via heat transfer with the molten pool and forming a solid layer comprising a mixture of the first material and the second material along the leading edge by cooling the molten pool.

17. The machine component of claim 16 wherein the step of forming a solid layer comprises forming a first solid layer and the step of returning the leading edge contour to the specified contour comprises building up the leading edge via the first solid layer, the step of returning the leading edge contour to the specified contour further comprising building up the leading edge via forming a plurality of additional solid layers along the leading edge.

18. The machine component of claim 17 comprising a turbine wheel for a turbocharger having a plurality of turbine blades.

19. The machine component of claim 18 wherein the receiving step further comprises receiving a turbine wheel having a plurality of damaged turbine blades each defining a leading edge contour different from the specified contour, the process further comprising a step of returning the leading edge contour of each one of the damaged turbine blades to the specified contour.

\* \* \* \* \*